United States Patent
Gabryjelski et al.

(10) Patent No.: US 7,457,921 B2
(45) Date of Patent: Nov. 25, 2008

(54) WRITE BARRIER FOR DATA STORAGE INTEGRITY

(75) Inventors: Henry P Gabryjelski, Seattle, WA (US); Krishnan Varadarajan, Redmond, WA (US); Peter W Wieland, Seattle, WA (US); Raju Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 11/064,491

(22) Filed: Feb. 23, 2005

(65) Prior Publication Data
US 2006/0190510 A1  Aug. 24, 2006

(51) Int. Cl.
G06F 12/12 (2006.01)

(52) U.S. Cl. ................ 711/135; 711/134

(58) Field of Classification Search .......... 711/135
See application file for complete search history.

(56) References Cited

U.S. PATENT DOCUMENTS

| 6,959,439 B1 * | 10/2005 | Boike | 719/326 |
| 6,973,554 B2 * | 12/2005 | Dussud | 711/170 |
| 7,082,495 B2 * | 7/2006 | DeWhitt et al. | 711/113 |
| 2003/0200392 A1 * | 10/2003 | Wright et al. | 711/118 |
| 2007/0279411 A1 * | 12/2007 | Bakalash et al. | 345/419 |

* cited by examiner

Primary Examiner—Gary J Portka
Assistant Examiner—Hamdy S Ahmed
(74) Attorney, Agent, or Firm—Amin, Turocy & Calvin, LLP

(57) ABSTRACT

A system that facilitates the storage of data using a write barrier. The system interfaces to a hardware component that stores data, and includes a write barrier component that dynamically employs instructions compatible with the hardware component to ensure data integrity during storage of the data. The write barrier component is independent of at least an operating system and an application and can operate in a least one of a user mode and a kernel mode. The write barrier component includes at least one of software instructions, routines, and methods, the selection of one or more of which is based on hardware data extracted from the hardware component. A selection component interrogates the hardware component for hardware data to facilitate selection of one or more instructions most suitable for interfacing to the hardware component. A coalescing component combines cache synchronization requests into a single set of instructions, which set is processed to flush a disk cache in one process.

19 Claims, 13 Drawing Sheets

WRITE BARRIER FOR DATA STORAGE INTEGRITY

TECHNICAL FIELD

This invention is related to techniques for ensuring data storage, and more specifically, to a write barrier mechanism for data storage integrity.

BACKGROUND OF THE INVENTION

Modern journaling file systems (e.g., NTFS) and specialized applications (e.g., SQL (Structured Query Language) databases) provide a backup and recovery capability, which requires an efficient mechanism to ensure that associated transactional logs (or any piece of data) are on the storage media for subsequent recovery (e.g., after a power outage). Before indexes on disk (e.g., magnetic media) are updated, the information about the changes is recorded in the transactional log. If a power or other system failure corrupts the indexes when being rewritten, the operating system can use the log to repair the indexes when the system is restarted. Thus, these systems and applications generally operate under strict regimes for ordering disk I/O operations. For example, open transactions must be committed to the transaction log before the file system structure is accessed; otherwise, a system fault could impact the file system integrity. If the system waits for the buffer contents to be written to disk, before new operations are submitted, the ordering is maintained.

Unfortunately, data storage is a very difficult area in which to work due to multiple hardware "defects" (or design limitations), incorrect implementations, or purposeful ignorance of the drive specifications to meet market demands. An example of this latter defect includes increasing performance (e.g., a 2% boost in a benchmark) at the expense of data integrity by providing onboard caching without considering the potential problems for ensuring data integrity at the storage media.

Operating systems can provide multiple mechanisms to ensure integrity of the logs on the storage media. For example, an application can use write-through semantics provided by the operating system to ensure that the data is written to the media before the write operation is completed. However, not all hardware storage devices support write-through capability. In one example, an upper layer file system initiates a write-through request to a class driver, which class driver further issues its write-through request (with a FUA (Forced Unit Access) bit set) to an IDE (Integrated Drive Electronics) driver associated with an ATA hardware storage device. However, the device does not support FUA. Thus, in the translation that occurs for a write-through request in the storage stack for the ATA disk drive, the write-through semantics of the request are lost when communicating from the IDE driver to the hardware device.

In another methodology, an application could flush all the buffered data associated with a file to the storage media. The file system and other components could also flush the intermediate buffers. However, the storage stack is oblivious to file boundaries and does not associate requests with the file to which they are destined. Moreover, where the storage device includes an onboard cache, which is becoming increasingly commonplace, none of theses storage devices support selective flush of their hardware cache. The driver, in that case, succeeds the request by requesting the device flush its entire cache. The upper layers are not informed of this, since a full flush does ensure that the requested range is also flushed. Thus, the requests have the effect of flushing the entire hardware cache on the device, which may take significantly longer than flushing only a small section of the hardware cache.

In some operating systems, the driver stack is inherently asynchronous and does not guarantee request ordering. It is the responsibility of the application to take care of any data dependencies that might require a synchronous behavior. Consider an application that wants to write a group of data to disk and ensure that the data group is on the media before exiting. Given a sequence of I/O requests W1, W2, and W3 followed by a Flush operation, the operations would not ensure write ordering or data coherence because the I/O requests W1, W2, W3 and Flush are essentially asynchronous and the lower layers could re-order the requests. Thus, the Flush operation could occur before the preceding write requests are completed. This is by design and is one of the basic concepts required to fully support asynchronous behavior. In addition, it is not sufficient to wait for the last write sent (W3) to complete, due to the same asynchronous reordering of requests that is possible in these operating systems. In order to accomplish the goal of ensuring the data is safely stored to the media, the application should wait for all its outstanding writes to complete before issuing the flush request. Thus, it is a fallacy to assume that the storage stack services requests in the order received. Note, however, that the completion of write requests in itself, does not guarantee that the data is on the media, since the data could reside in any one of the intermediate caches (e.g., an onboard cache of the storage device). A flush (or synchronize cache) is therefore also required after waiting for all the writes to complete.

In addition to the translation of flushing buffers, the disk driver can also perform coalescing of flush requests to improve performance. The principal goal of flush coalescing is to ensure that the semantics exposed to the higher layers is unaltered while mitigating the performance hit incurred by multiple flush requests. Thus, applications issuing requests would see the same behavior semantically when the flush requests are coalesced. In one implementation, the central idea is to use a token request as a representative of all the pending flush requests. However, once a flush request is sent down to the port driver associated with the storage device, there is no way to determine exactly when the flush request was issued to the hardware. As such, it is not possible to complete the flush requests that arrive when a request is outstanding. Instead, the requests are queued, and a representative is sent down when the outstanding request is completed.

Write barrier is another technique to aid databases and file systems in writing logs efficiently. A write barrier primitive is simply a way of logically grouping a set of I/O data, and then ensuring that all of that group of I/O data is physically on the storage media before the write barrier primitive is signaled as complete, and without any additional ordering requirements on the I/O that are in any set. That object is then loosely termed as "write-protected", or more correctly termed "behind the write barrier."

Write barrier could be defined as a command (or a bit in the write I/O request) that ensures that the preceding writes in that group (associated write requests) are committed to the media. In operation, a block layer does not reorder any other request past a barrier request, in either direction. Thus, all requests issued prior to the barrier request are guaranteed to be completed before requests that were issued after the barrier are processed. A journaling system can issue a barrier request when committing a journal, and then move on with processing the next transaction. When the write barrier is completed, the application can be assured that its preceding writes have been committed to the media.

Unlike flush cache, write barrier provides a semblance of request ordering to the upper layers (e.g., the file system, and the file system needs to extend this to higher level applications). This is possible because the write barrier contains sufficient information about the write requests that it is trying to flush. Note, however, that the concept of write barrier is absent in currently available hardware; at the lowest level write barrier needs to be translated to a flush cache. Thus, there is a substantial unmet need for a single write barrier implementation for all hardware which uses the best capabilities of the hardware.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention is an efficient, backwards-compatible, purely client-driven implementation of write barriers without requiring any changes to the existing storage stack model of an operating system with an asynchronous I/O model. Additionally, the invention can be implemented in either user mode or kernel mode, which allows any application to benefit, if the application requires the performance of direct-I/O, for example. When employed with a file system, the subject invention exposes this capability to any client, using existing APIs. For example, the NTFS file system will be able to immediately benefit from the novel invention.

The invention provides a simple, client-controlled implementation of write barriers that can dynamically use the best possible method the hardware can offer, while imposing no ordering or synchronous/asynchronous restrictions on the storage stack.

The invention disclosed and claimed herein, in one aspect thereof, comprises a system that facilitates the storage of data. The system includes a hardware component that stores data, and a write barrier component that dynamically employs instructions compatible with the hardware component to ensure data integrity during storage of the data. The write barrier component is independent of at least an operating system and an application and can operate in a least one of a user mode and a kernel mode. The write barrier component includes at least one of software instructions, routines, and methods, the selection of one or more of which is based on hardware data extracted from the hardware component. The system further comprises a selection component that interrogates the hardware component for hardware data that facilitates the selection of one or more instructions suitable for interfacing to the hardware component. A coalescing component combines N cache synchronization requests from N applications into a single set of instructions, which set is processed to flush a disk cache fewer times than the number N of the cache synchronization requests.

In another aspect thereof, the subject invention is also multi-thread safe, allowing greater scaling opportunities.

In yet another aspect of the invention, the implementation can be written as a DLL (Dynamic Link Library) which other entities link against, as a static library other entities compile against, or implemented directly into any code to handle special cases.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
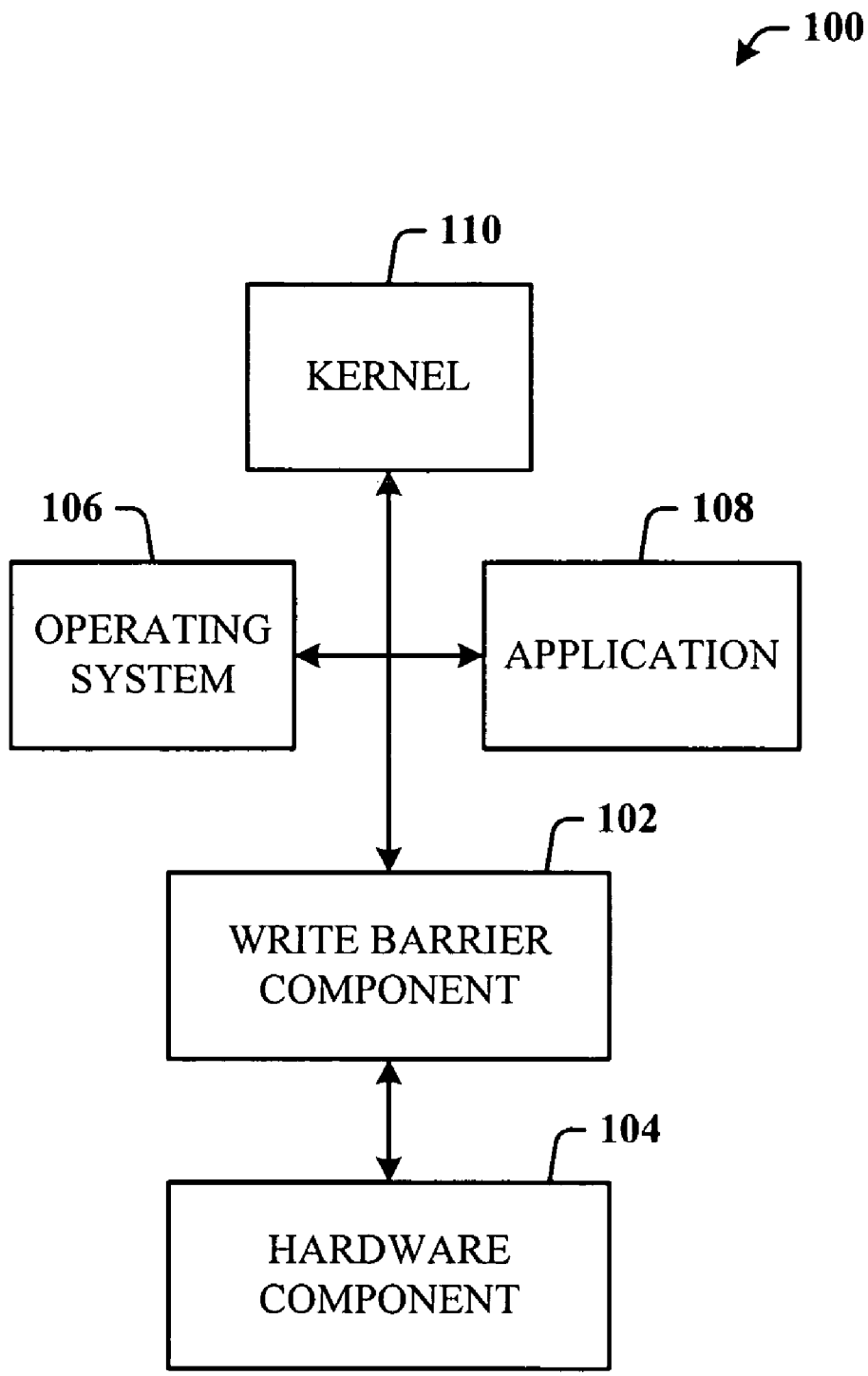
FIG. 1 illustrates a system that facilitates a write barrier implementation in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a hard disk drive, a plurality of drives (of optical and/or magnetic medium), a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates a write barrier implementation in accordance with the subject invention. The system 100 employs a write barrier component 102 that ensures data integrity on associated one or more hardware storage devices, denoted generally, as a hardware component 104.

The subject invention is application independent, that is, the write barrier component can be employed independent of being written into an operating system 106, independent of any application 108 that runs on the system 100, and suitably configurable to be run from a kernel 110 in kernel mode. This provides an efficient, backwardly-compatible, purely client-driven implementation of write barriers without requiring any changes to an existing storage stack model of the operating system 106 with an asynchronous I/O model. Implementation in either user mode or kernel mode allows any application 108 to benefit, if the application 108 requires the performance of direct-I/O, for example. Note that if an OS (Operating System) later provides support for this capability, the DLL (Dynamic Link Library) can transparently use the OS support instead of its own routines. This broadens the impact of "sharing" the flush cache coalescing.

When employed with a file system, the subject invention exposes this capability to any client, using existing APIs (Application Program Interfaces). For example, the NTFS file system developed by Microsoft Corporation is able to immediately benefit from the novel invention.

Additionally, the invention provides a simple, client-controlled implementation of write barriers that can dynamically use the best possible method offered by the hardware component 104, while imposing no ordering or synchronous/asynchronous restrictions on the operating system storage stack.

Figure 2:
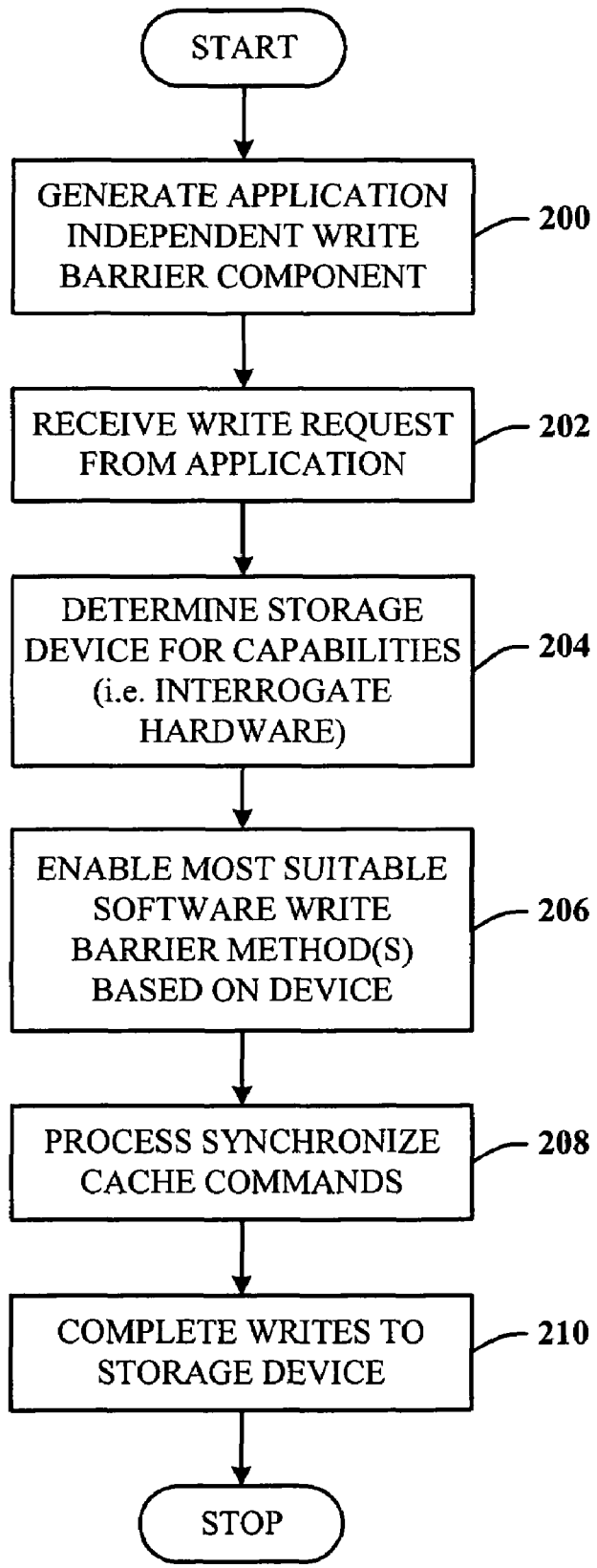
FIG. 2 illustrates a methodology of write barrier implementation in accordance with the invention.

FIG. 2 illustrates a methodology of write barrier implementation in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, the write barrier component is generated, including but not limited to methods, routines and calls. At 202, a write request is received from an application, whether the application is the operating system, a component of the operating system, an application running on the operating system, and/or the kernel. At 204, the write barrier component interrogates the storage device for its capabilities. These can include interface communications, command structure and, device type and other related specification information, for example. At 206, based on the received device capabilities data, the write barrier component enables the most suitable software components. At 208, when the applications issues write requests, one or more synchronize cache commands can be issued and processed. At 210, the application writes are completed, ensuring data storage integrity on the associated device. As indicated supra, the order in which these processes occur is not fixed by the order presented in the flow chart. For example, the write barrier component can interrogate the available hardware storage device(s) before a write request is received from software.

Figure 3:
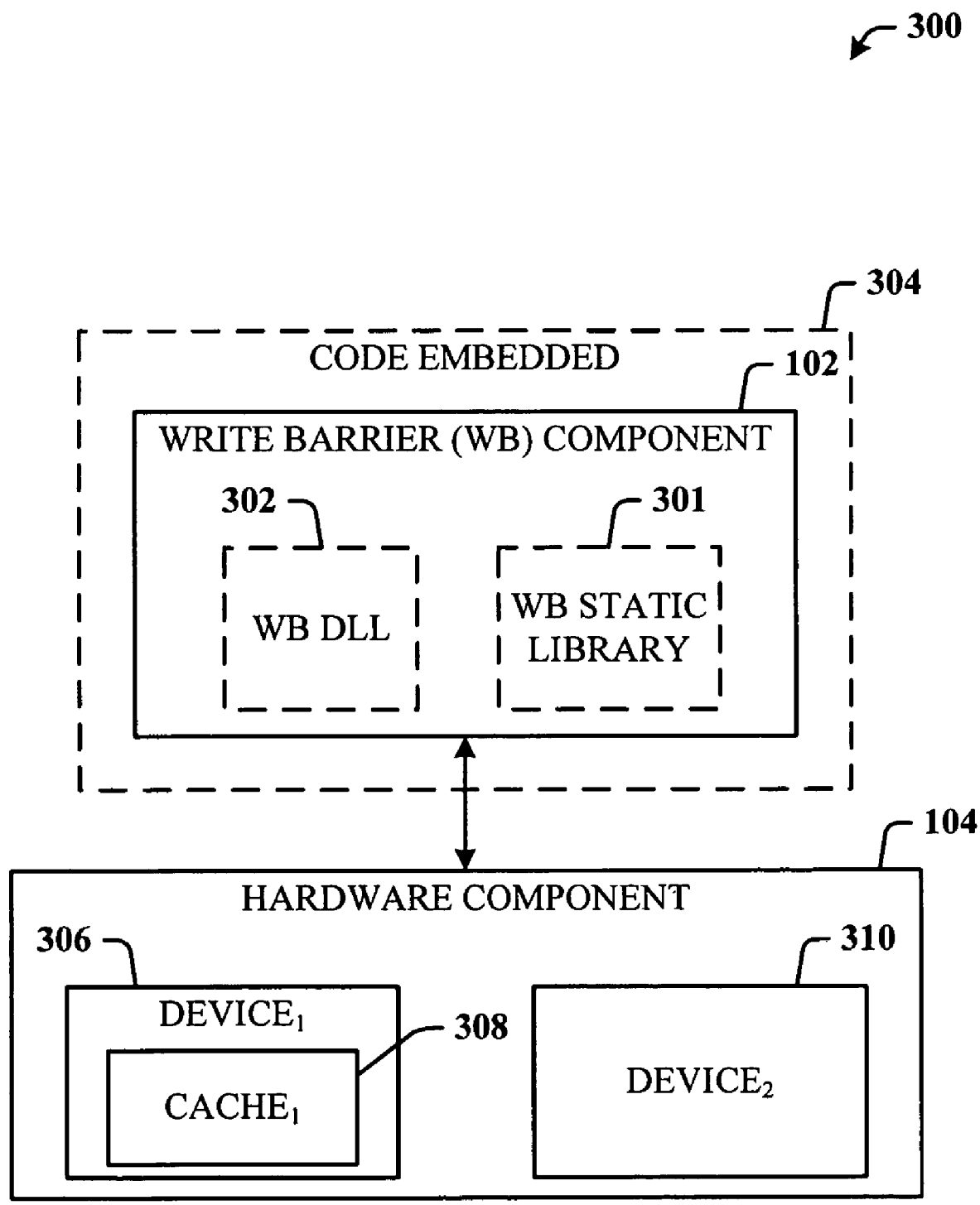
FIG. 3 illustrates a system that employs write barrier in accordance with the invention.

Referring now to FIG. 3, there is illustrated a system 300 that employs write barrier in accordance with the invention. The software of the write barrier component 102 can be utilized in a number of ways. For example, the write barrier component 102 can be provided as a static library 301 against which other users can compile. Alternatively, or in addition thereto, the component 102 can be provided as a DLL (Dynamic Link Library) module 302 against which other user can link software. The write barrier component 102 can also be embedded directly into code to accommodate special cases.

The hardware component 104 is not limited to a single storage device. As illustrated, it can include multiple storage devices (denoted $DEVICE_1$ and $DEVICE_2$) across which the application writes are performed. Moreover, the devices can be different devices (e.g., a magnetic storage device and an optical storage device). Still further, a first device 306 can have an onboard cache 308, while a second device 310 does not. Both drives can operate under different interface electronics or the same (e.g., IDE, SCSI, . . . ). Essentially, the hardware component 104 can include any number of drives, drive types, storage capacities, storage media types, drive interface electronics and architectures.

Figure 4:
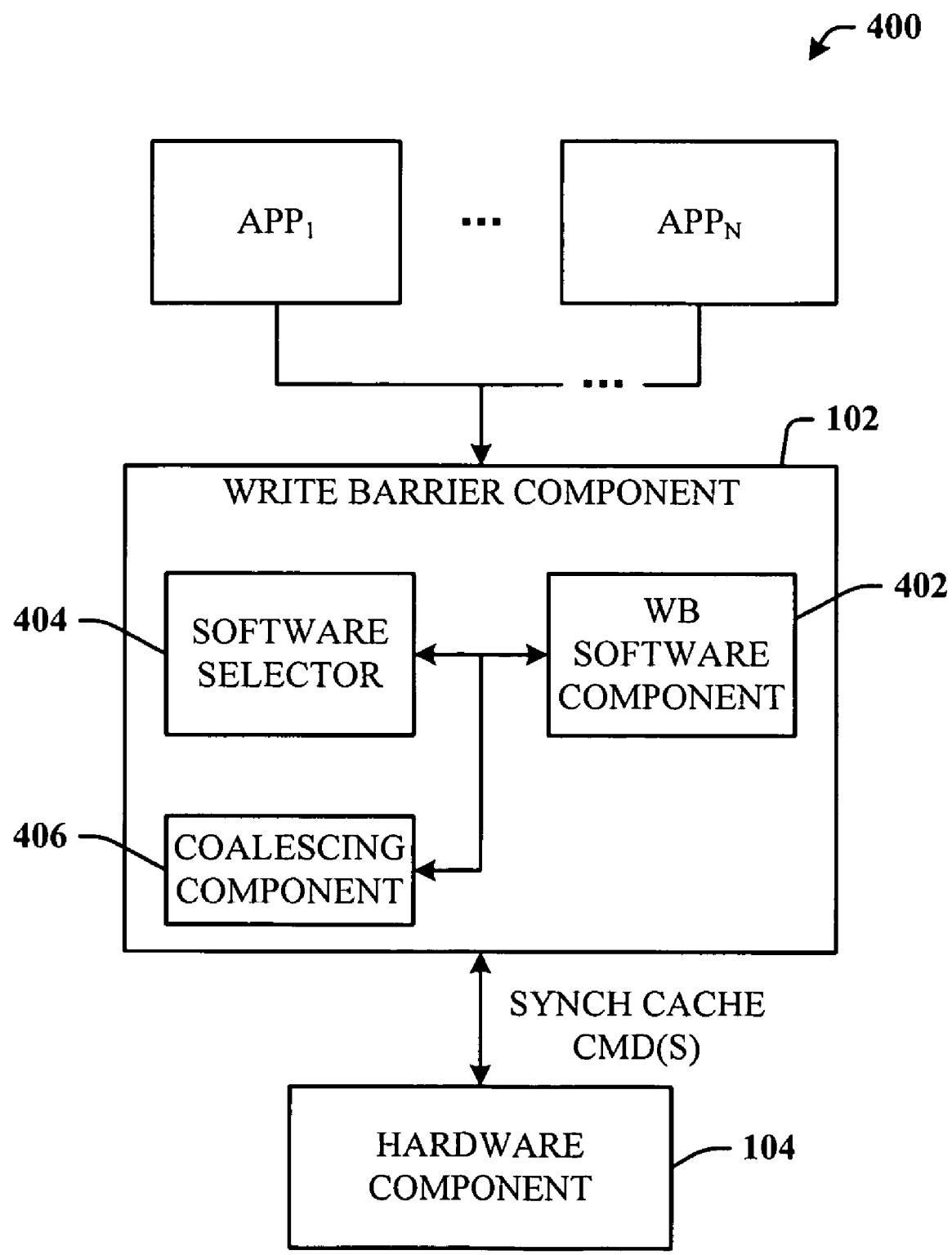
FIG. 4 illustrates a system of write barrier command coalescing from multiple applications in accordance with the invention.

FIG. 4 illustrates a system of write barrier command coalescing from multiple applications in accordance with the invention. Conventionally, when two or more applications are involved using write barriers, both applications can require the writes to go down to the storage device. The first application sets up a write barrier, the second application sets up its write barrier, both applications then start sending writes down and then both stop sending writes. Eventually, one of the applications sends a request to complete their write barrier. This initiates a flush cache command for current hardware. When the second application chooses to complete its write barrier, currently, there is no way to know that this has actually occurred, since there is no sense of ordering in the stacks today in operating systems. Thus, when the second application sends the request, the entire disk is flushed again. A coalescing component 406 would enable the second application to know its write barrier has completed without this additional flushing of the disk cache.

Referring again the FIG. 4, multiple applications 400 (denoted $APP_1, \ldots, APP_N$) are operating to store data on the hardware component 104. The write barrier component 102 receives and processes write requests issued from the applications 400. The write barrier component 104 provides simple library routines (denoted as WB Software 402) which allow the coalescing of multiple write barriers into a single set of synchronize cache commands in order to minimize the impact on other applications. In support thereof, the write barrier component 102 includes the write barrier software 402, and a software selector 404 that interrogates the hardware component 104 and selects the most suitable software from the WB software component 402 for use with the storage device(s).

The selector component 404 can include a table of storage devices and associated specification information and capabilities, which table is accessed once sufficient drive information is known. Thus, a lookup process can be employed in order to obtain the optimum instruction, routines, and methods for interfacing to a given storage device. For many drive types, drive information can be obtained through page mode processing. Given this information, the write barrier component 102 can then determine in what ways the storage device (s) (the hardware component 104) can accommodate the write barrier architecture of the subject invention. Another method is to provide an updateable list a known compatible drive types which is then accessed to determine the most suitable software interface for implementing the write barrier and ensuring data integrity. Other conventional techniques for obtaining storage device information are within contemplation of the subject invention. The write barrier component 102 also includes the coalescing component 406 that receives multiple synchronize cache commands and combines them into the single set for processing against the hardware component 104. In other words, conventionally, two applications will cause two flushings of the storage disk cache. With the novel implementation of the subject invention, the cache flush occurs only once due to the single set of synchronize cache commands.

Figure 5:
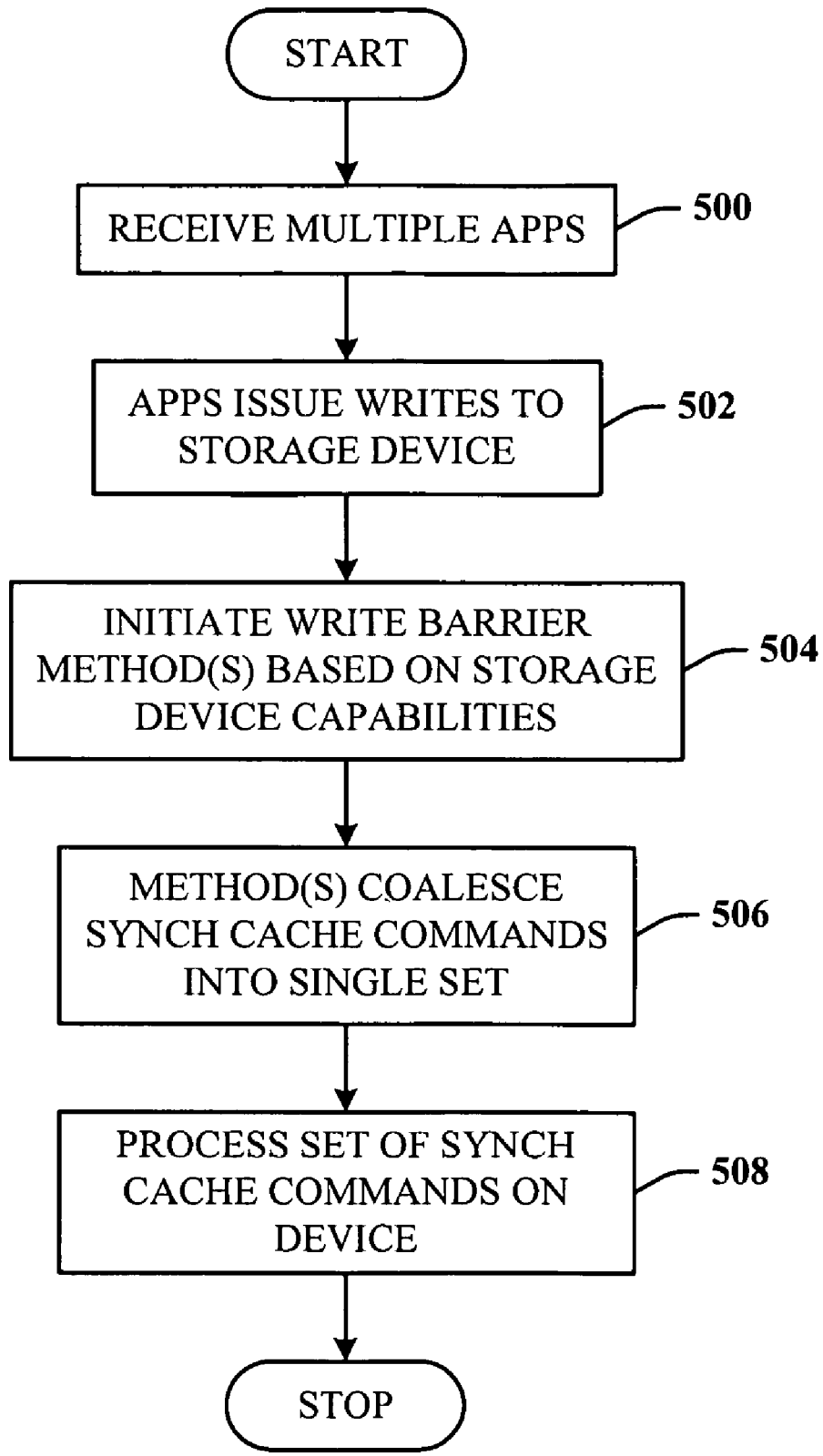
FIG. 5 illustrates a methodology of write barrier command coalescing in accordance with the invention.

FIG. 5 illustrates a methodology of write barrier command coalescing in accordance with the invention. At 500, multiple applications are received for execution of data. At 502, a plurality of the applications issue write requests to the storage device(s). At 504, suitable write barrier methods of the write barrier component are selected based upon the capabilities of the storage device(s) selected. At 506, multiple synchronize cache commands are combined into a single set using methods of the write barrier software. At 508, the set of synchronize cache commands are processed against the one or more storage devices.

Figure 6:
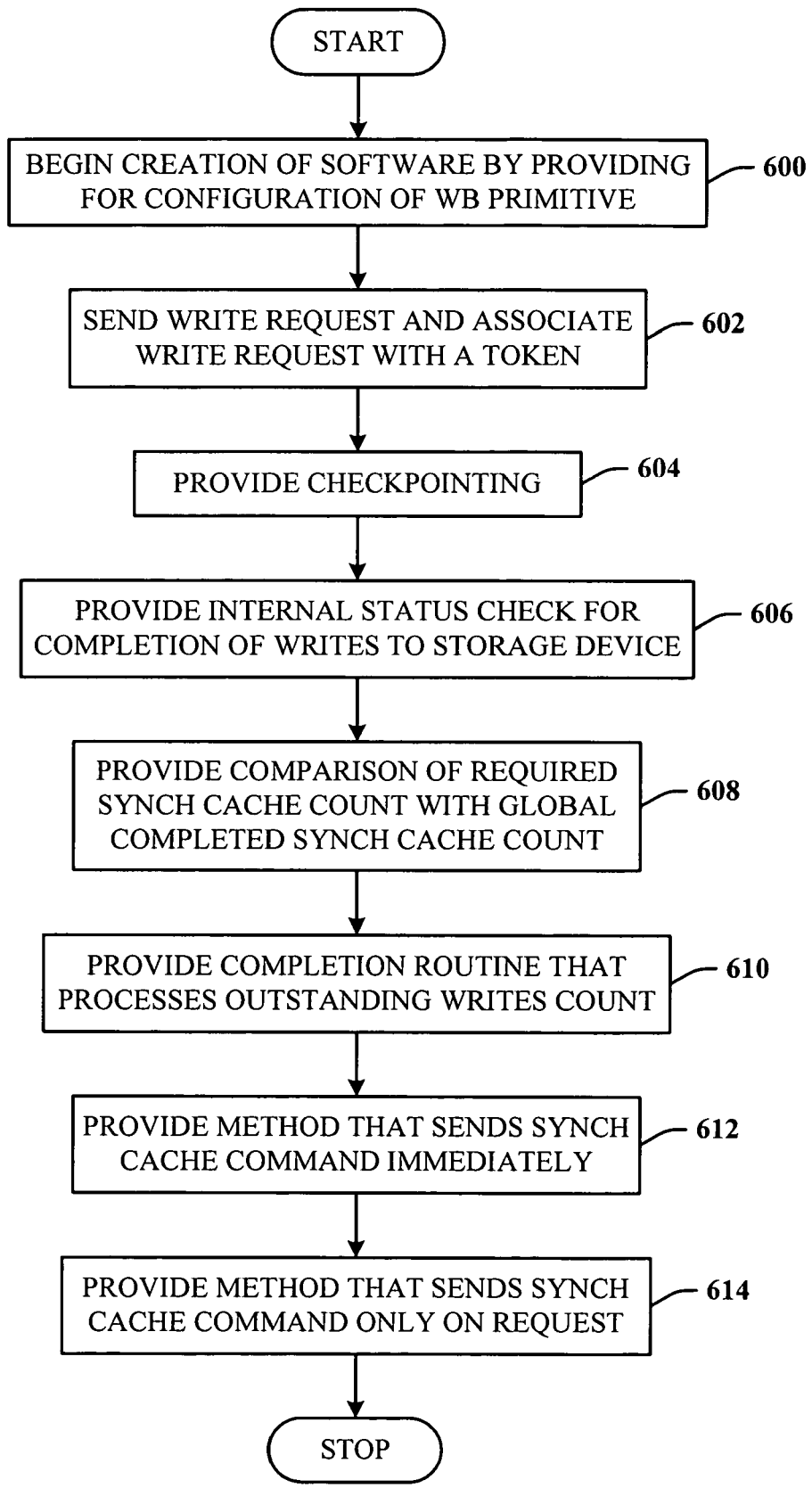
FIG. 6 illustrates a methodology of implementing write barrier software in accordance with the invention.

FIG. 6 illustrates a methodology of implementing write barrier software in accordance with the invention. This implementation will be described in accordance with a library and the notion of a token; however, it is to be appreciated by one skilled in the art, and as described supra, that the write barrier software can be embodied as a DLL or code embedded in an application for special cases, for example. Note, that a token is simply a pointer to an opaque data blob that a caller cannot directly access.

At 600, the write barrier software can include configuration of a write barrier primitive. For example, an instruction defined as TOKEN SetupWriteBarrier ( ) sets up a write barrier primitive for later use. This can pre-allocate all required resources to complete the write barrier to reduce the number of failure paths that can occur once this primitive is setup.

At 602, a write request is sent and associated with a token. An instruction STATUS Write(TOKEN writeBarrier, <other write arguments>) can be used to perform such an operation. In the subject invention, this instruction would increment an internal counter (an "outstanding writes" counter) using InterlockedIncrement ( ), such that no locks are required. Additionally, a standard completion routine wrapper can be added.

At 604, checkpointing is provided. An instruction STATUS MarkWriteBarrierCheckpoint(TOKEN writeBarrier) marks the token with a checkpoint. This allows for later "collapsing" of synchronize cache commands on hardware without LBA (Logical Block Addressing) range synchronize cache support. Further writes using this token can be prevented.

A synchronize cache command has the capability to synch from a first LBA to a second LBA in a contiguous range (LBA with LENGTH fields). This is very helpful for storing a contiguous file, since only those sectors can be synchronized about without impacting the performance of other applications using that disk. A problem with the synchronize cache command, as actually implemented, is that there is no way to specify to only synchronize to only a small amount of the disk. As drive storage capacities increase (e.g., 200-500 GB disks), synchronize cache operations for a typical 8 Mb of onboard cache can take a relatively long time, even if the application only cares about one sector of data making it to the disk. Thus, it is desired to mitigate the coast of processing a synchronize cache command to the entire disk.

At 606, an internal status check mechanism is provided for determining the completion of writes to a storage device. A method STATUS WaitForWriteBarrier(TOKEN writeBarrier) can be provided to facilitate such a determination. At 608, a method is provided that compares a required synch cache count with a global or per-device completed synch cache count(s). A method STATUS WaitForWriteBarrier (TOKEN writeBarrier) is provided that facilitates this comparison.

At 610, a completion routine (denoted STATUS WriteBarrierWritecompletion (TOKEN writeBarrier, <other arguments>)) is provided to process an outstanding writes count. At 612, a method (denoted STATUS WriteBarrierWritecompletion) is provided that sends a synch cache command immediately. At 614, a method (denoted STATUS WriteBarrierWriteCompletion) is provided that sends of a synch cache command only upon request.

Since both methods use the same APIs, it is possible to hide the implementation details from the client and use the most effective method for a given disk drive. In addition, it is contemplated that a method can be explicitly chosen for certain scenarios. An added benefit is that the above implementation, which describes only a single target disk drive, can be extended to support a write barrier across multiple disparate storage devices.

Figure 7:
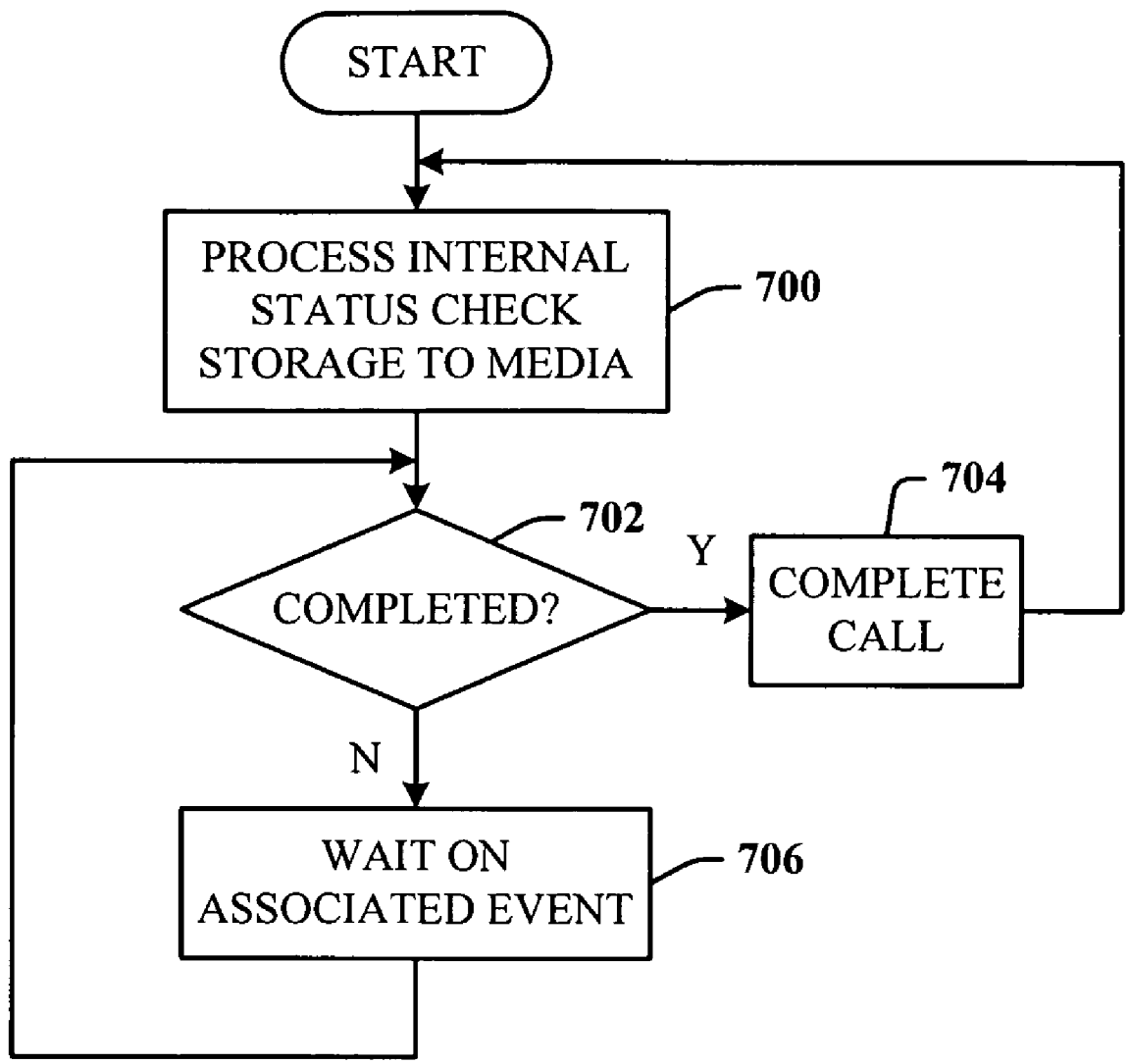
FIG. 7 illustrates a methodology of internal status checking in accordance with the invention.

FIG. 7 illustrates a methodology of internal status checking in accordance with the invention. At 700, a token's internal status shows if all writes previously associated with this token have completed and are guaranteed to have been written to the media. At 702, if writes have fully completed, flow proceeds to 704 where the call can complete immediately. Flow is then back to 700. If the writes have not fully completed, flow proceeds from 702 to 706, where it must wait on the event associated with this token. This is indicated by flow looping back to 702 to determine if the writes have been completed. This method is most useful with drives that support LBA and count in the SYNCHRONIZE CACHE command. The method STATUS WaitForWriteBarrier(TOKEN writeBarrier) provides such a determination.

Figure 8:
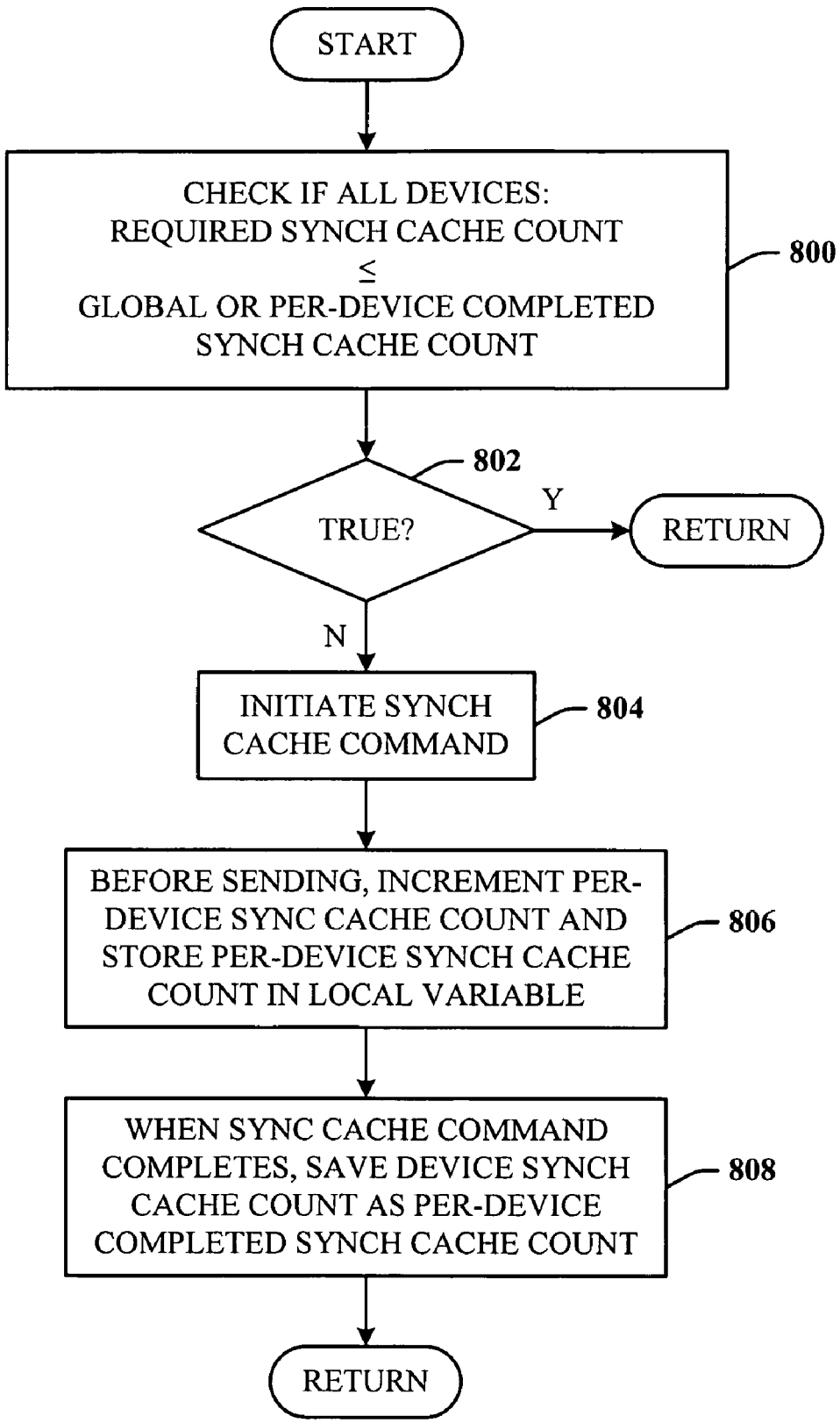
FIG. 8 illustrates a methodology of comparing counts in accordance with the invention.

FIG. 8 illustrates a methodology of comparing counts in accordance with the invention. At 800, a check is made to determine if all the devices "required synch cache count" are less than or equal to the "global or per-device completed synch cache count". At 802, if so, then previous synchronize cache command(s) have guaranteed that the writes made it to the media and the process returns.

If any of the devices "required synch cache count" are greater than the "global or per-device completed synch cache count", then a synchronize cache command is initiated to each required device, as indicated at 804. At 806, before sending the synchronize cache command, however, the "per-device synch cache count" is incremented and stored in a local variable for each device. When that synchronize cache command completes, that local copy is stored as the "per-device completed synch cache count", as indicated at 808. The process then returns. This method is most useful with existing drives which do not support the LBA and count in the SYNCHRONIZE CACHE command. The method STATUS WaitForWriteBarrier(TOKEN writeBarrier) facilitates this comparison.

Figure 9:
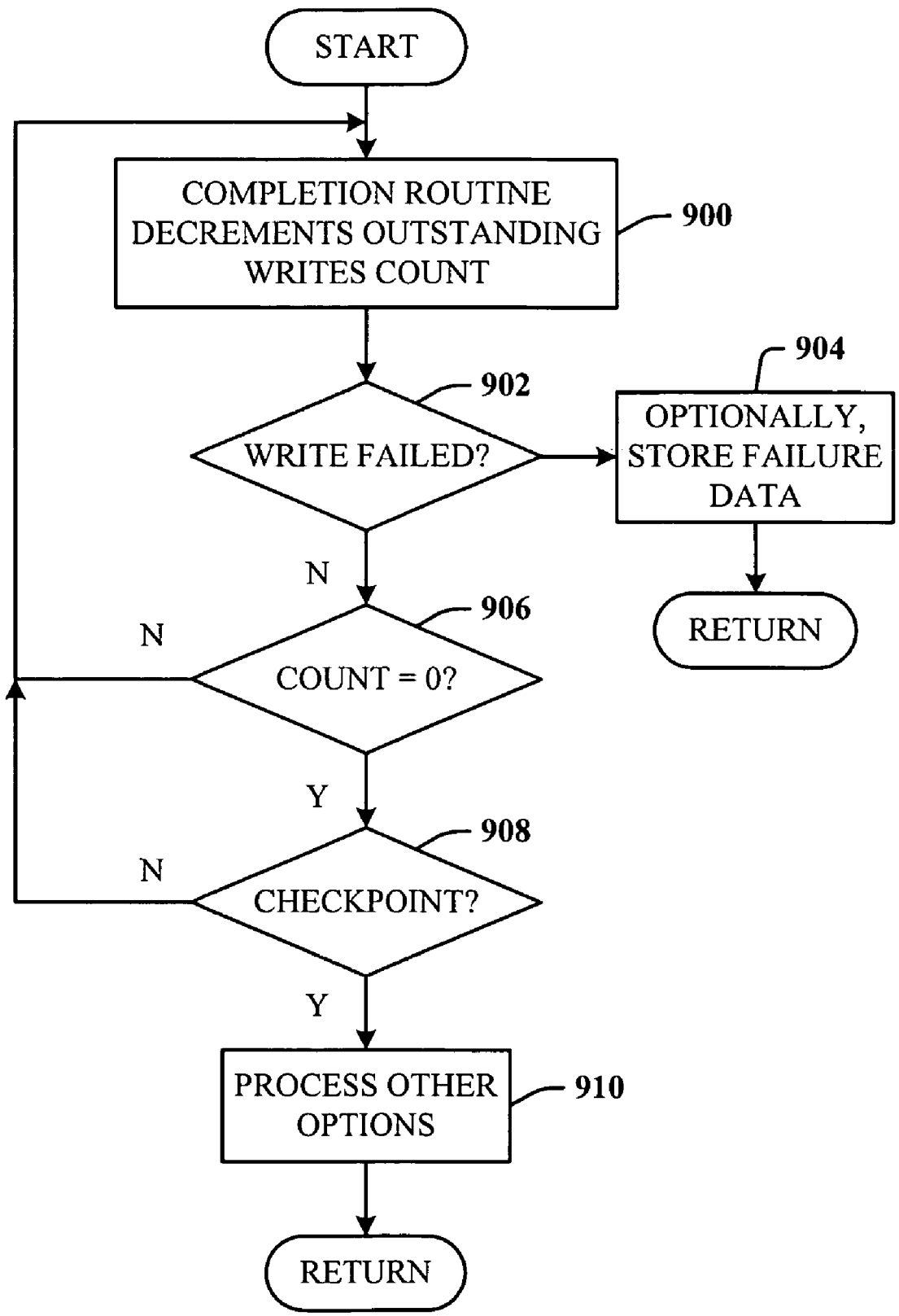
FIG. 9 illustrates a methodology of processing outstanding writes in accordance with the invention.

Referring now to FIG. 9, there is illustrated a methodology of processing outstanding writes in accordance with the invention. At 900, the completion routine decrements the "outstanding writes" count in the token. At 902, if the write failed, additional state information on the failure (which write) may optionally be kept with the token, if desired, as indicated at 904. The process then returns. If the write did not fail, the "outstanding writes" count has reached zero, as indicated at 906, and the token was marked with a checkpoint (no more writes allowed), as indicated at 908, then this is guaranteed to be the completion of the last write associated with this token. At this point, there are other options which can be exercised. If the count is not zero, flow is from 906 back to 900 to continue the decrementing operation. If the token is not marked with a checkpoint, flow is also back to 900. The completion routine STATUS WriteBarrierWritecompletion (TOKEN writeBarrier, <other arguments>) provides processing of the outstanding writes count.

Figure 10:
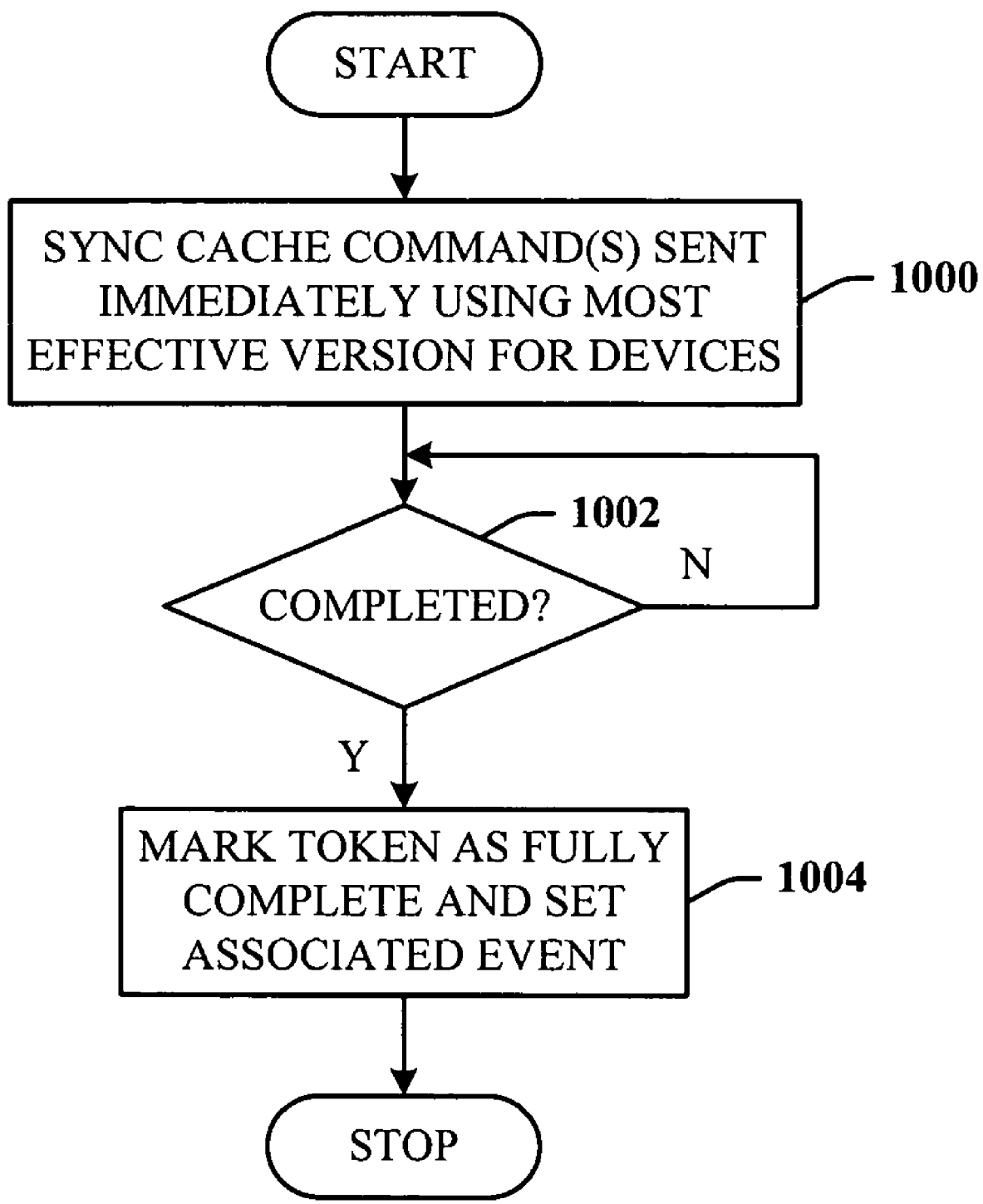
FIG. 10 illustrates a methodology of immediately sending a synchronize cache command in accordance with the invention.

Referring now to FIG. 10, there is illustrated a methodology of immediately sending a synchronize cache command in accordance with the invention. At 1000, SYNCHRONIZE CACHE command(s) are sent immediately using the most effective version for the storage device(s). At 1002, the system determines if the synch cache process has completed. If not, flow is loops back to continue checking. When this command (or set of commands) completes, the token is marked as fully complete and the event associated with this token is set, as indicated at 1004. The benefit here is the ease of implementation. The method STATUS WriteBarrierWriteCompletion (TOKEN writeBarrier, <other arguments>) sends a synch cache command immediately. This method is most useful with drives which support the LBA and count in the SYNCHRONIZE CACHE command.

Figure 11:
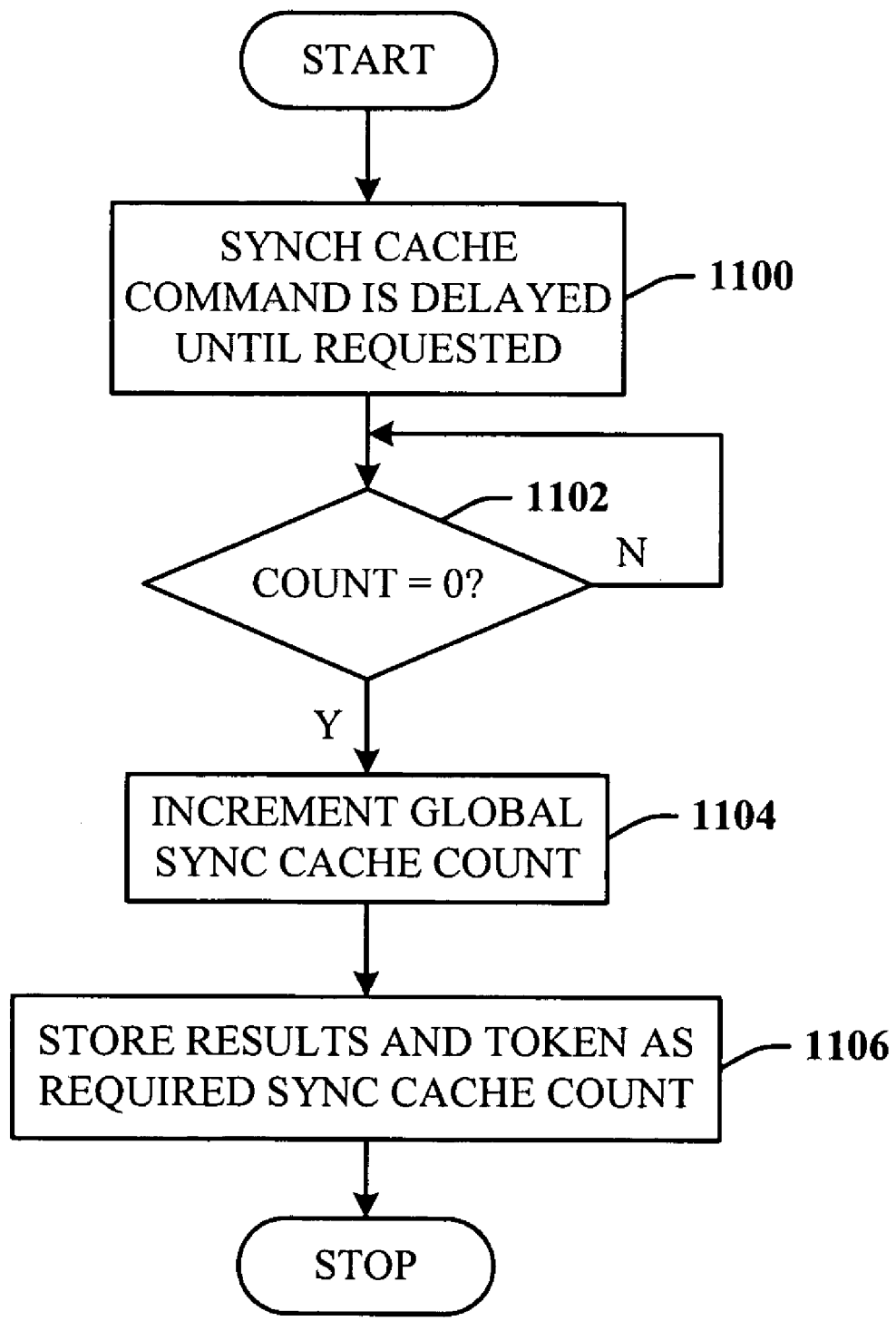
FIG. 11 illustrates methodology of sending a synchronize cache command only upon request, in accordance with the invention.

FIG. 11 illustrates a methodology of sending a synchronize cache command only upon request, in accordance with the invention. This allows the collapsing of multiple synchronize cache commands into a single set. At 1100, a synch cache command is delayed until requested. At 1102, when the counter reaches zero, indicating no further writes will be occurring, a global counter (global sync cache count) is incremented, at 1104, and the result stored with the token as the "required sync cache count", as indicated at 1106. If the count has not reached zero, flow loops back to the input of 1102 to continue monitoring the count. No synchronize cache commands are explicitly sent. The method STATUS WriteBarrierWritecompletion (TOKEN writeBarrier, <other arguments>) sends a synch cache command only upon request.

Figure 12:
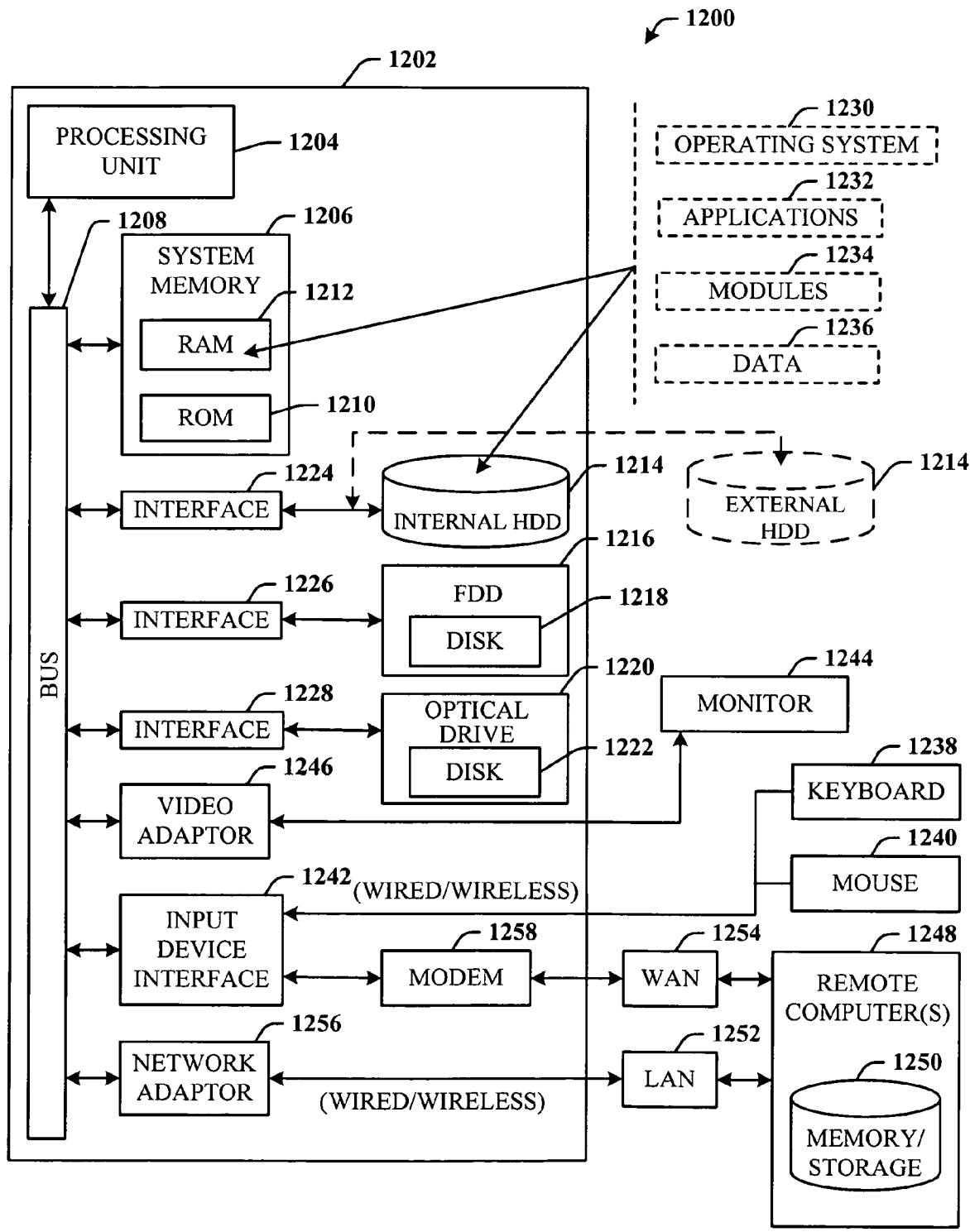
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject invention.

The drives and their associated computer-readable media provide non-volatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
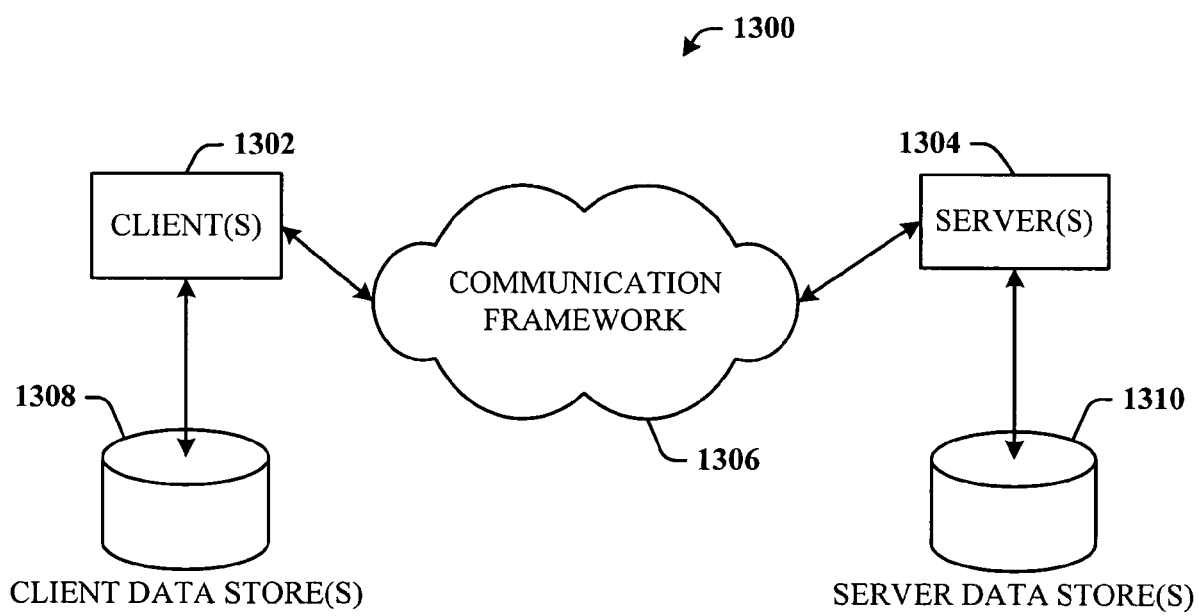
FIG. 13 illustrates a schematic block diagram of an exemplary computing environment in accordance with the subject invention.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates storage of data, comprising:
    a hardware component that stores the data that is input asynchronously; and
    a write baiter component that receives multiple synchronize cache commands and combines them into a single set for processing against the hardware component to flush the cache only once, interrogates the hardware component for its device capabilities, dynamically selects instructions suitable for interfacing to the hardware component and employs the selected instructions to ensure data integrity during storage of the data, wherein the device capabilities include at least one of device type, command structure or interface communications.

2. The system of claim 1, wherein the write baiter component is independent of at least an operating system and an application.

3. The system of claim 1, wherein the write baiter component operates in a least one of a user mode and a kernel mode.

4. The system of claim 1, wherein the write barrier component includes at least one of software instructions, routines, and methods, the selection of one or more of which is based on device capability data extracted from the hardware component.

5. The system of claim 1, wherein the write baiter component is employed as one of a DLL (dynamic link library) and a static library.

6. The system of claim 1, further comprising a selection component that selects instructions suitable for interfacing to the hardware storage component.

7. The system of claim 1, further comprising a selection component that interrogates the hardware component for hardware data that facilitates selection of at least one of the instructions suitable for interfacing to the hardware component.

8. The system of claim 1, further comprising a coalescing component that combines N cache synchronization requests from N applications into a single set of instructions, which set is processed to flush a disk cache fewer times than the number N of the cache synchronization requests.

9. The system of claim 8, wherein the disk cache is flushed once.

10. A computer that employs the system of claim 1.

11. A computer-readable storage medium having computer-executable instructions for performing a method of storing data, the method comprising:
    interfacing to at least one hardware storage device, which at least one storage device stores the data, the data is input asynchronously;
    interrogating the at least one hardware storage device to determine capabilities thereof, wherein the capabilities include at least one of device type, command structure and or interface communications;
    selecting one or more instructions based on the capabilities to impose a write baffler that ensures data integrity during storage of the data;
    combining multiple synchronize cache commands into a single set for processing against the hardware device;
    flushing the data to the at least one hardware storage device; and
    determining that a set of write requests associated with the write baffler has been completed.

12. The medium of claim 11, the method further comprising defaulting to one or more instructions that guarantee storage of the data on the storage device.

13. The medium of claim 11, the method further comprising coalescing a plurality of write barriers into a single set of cache synchronization commands that is processed to flush the data to the at least one storage device in a single process.

14. The medium of claim 11, the method further comprising accessing the capabilities of the at least one storage device via a page mode.

15. The medium of claim 11, the method further comprising synchronizing the data to the at least one storage device based on a LBA (logical block address) and a LENGTH parameter.

16. The medium of claim 11, the method further comprising sending a cache synchronization command immediately.

17. The medium of claim 11, the method further comprising sending a cache synchronization command only in response to a request.

18. A system that facilitates storage of data, comprising a computer processor for executing the following components:
    means for interfacing to a hardware storage device that stores the data that is input asynchronously;
    means for interrogating the hardware storage device to determine capabilities of the device wherein the device capabilities include at least one of device type, command structure or interface communications and for selecting one or more instructions based on the capabilities to impose a write barrier that ensures data integrity during storage of the data;
    means for combining multiple synchronize cache commands into a single set for processing against the hardware device;
    means for flushing the data to the hardware storage device and for determining that a set of write requests associated with the write barrier have been completed.

19. The system of claim 18, further comprising means one or more methods that a explicitly chosen to support a write barrier across multiple disparate storage devices.

* * * * *